US012474667B2

(12) United States Patent
Mitsuno

(10) Patent No.: US 12,474,667 B2
(45) Date of Patent: Nov. 18, 2025

(54) IMAGE FORMING APPARATUS

(71) Applicant: TOSHIBA TEC KABUSHIKI KAISHA, Tokyo (JP)

(72) Inventor: Keigo Mitsuno, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 18/458,285

(22) Filed: Aug. 30, 2023

(65) Prior Publication Data

US 2025/0074733 A1 Mar. 6, 2025

(51) Int. Cl.
*G03G 21/16* (2006.01)
*B65H 7/02* (2006.01)

(52) U.S. Cl.
CPC .......... *G03G 21/1657* (2013.01); *B65H 7/02* (2013.01); *B65H 2301/4482* (2013.01); *B65H 2511/10* (2013.01); *B65H 2511/20* (2013.01); *B65H 2553/52* (2013.01); *B65H 2701/12422* (2013.01); *B65H 2701/1244* (2013.01); *B65H 2801/06* (2013.01)

(58) Field of Classification Search
CPC .... B65H 2553/52; B65H 9/002; B65H 31/02; B65H 2301/4482; B65H 2511/512; B65H 2701/1244; G06K 17/0025; G06K 19/0723
See application file for complete search history.

(56) References Cited

U.S. PATENT DOCUMENTS 11,571,917 B2 * 2/2023 Kuniya ...................... B41J 3/50

FOREIGN PATENT DOCUMENTS

| | | |
|---|---|---|
| JP | 2004-98539 | 4/2004 |
| JP | 2005-43860 | 2/2005 |

* cited by examiner

*Primary Examiner* — Jeremy R Severson

(74) *Attorney, Agent, or Firm* — Amin, Turocy & Watson, LLP

(57) ABSTRACT

According to one embodiment, there is provided an image forming apparatus including a conveyance unit, a detection unit, an image forming unit, and a control unit. The conveyance unit is configured to convey a print medium to which a wireless tag is attached and on which wireless tag position information indicating a position of the wireless tag is formed. The detection unit is configured to detect the wireless tag position information formed on the print medium. The image forming unit is configured to form an image on the print medium. The control unit is configured to control the conveyance unit and the image forming unit based on the wireless tag position information detected by the detection unit.

19 Claims, 6 Drawing Sheets

IMAGE FORMING APPARATUS

FIELD

Embodiments described herein relate generally to an image forming apparatus, a wireless tag position information forming apparatus, and a print medium.

BACKGROUND

Conventionally, an image forming apparatus capable of forming an image on a print medium on which a radio frequency identification (RFID) tag is attached is known. In such an image forming apparatus, the user places the print medium so that the print medium faces a predetermined direction with respect to a paper feed cassette when replenishing the paper feed cassette with the print medium. With this configuration, the image forming apparatus can accurately specify a position of the RFID tag on the print medium. However, the user may direct the printing medium in a direction different from the predetermined direction with respect to the paper feed cassette. The act of making the direction of the print medium different from the predetermined direction leads to a failure of writing to and reading from the RFID tag, and thus is not desirable.

DETAILED DESCRIPTION

Figure 1:
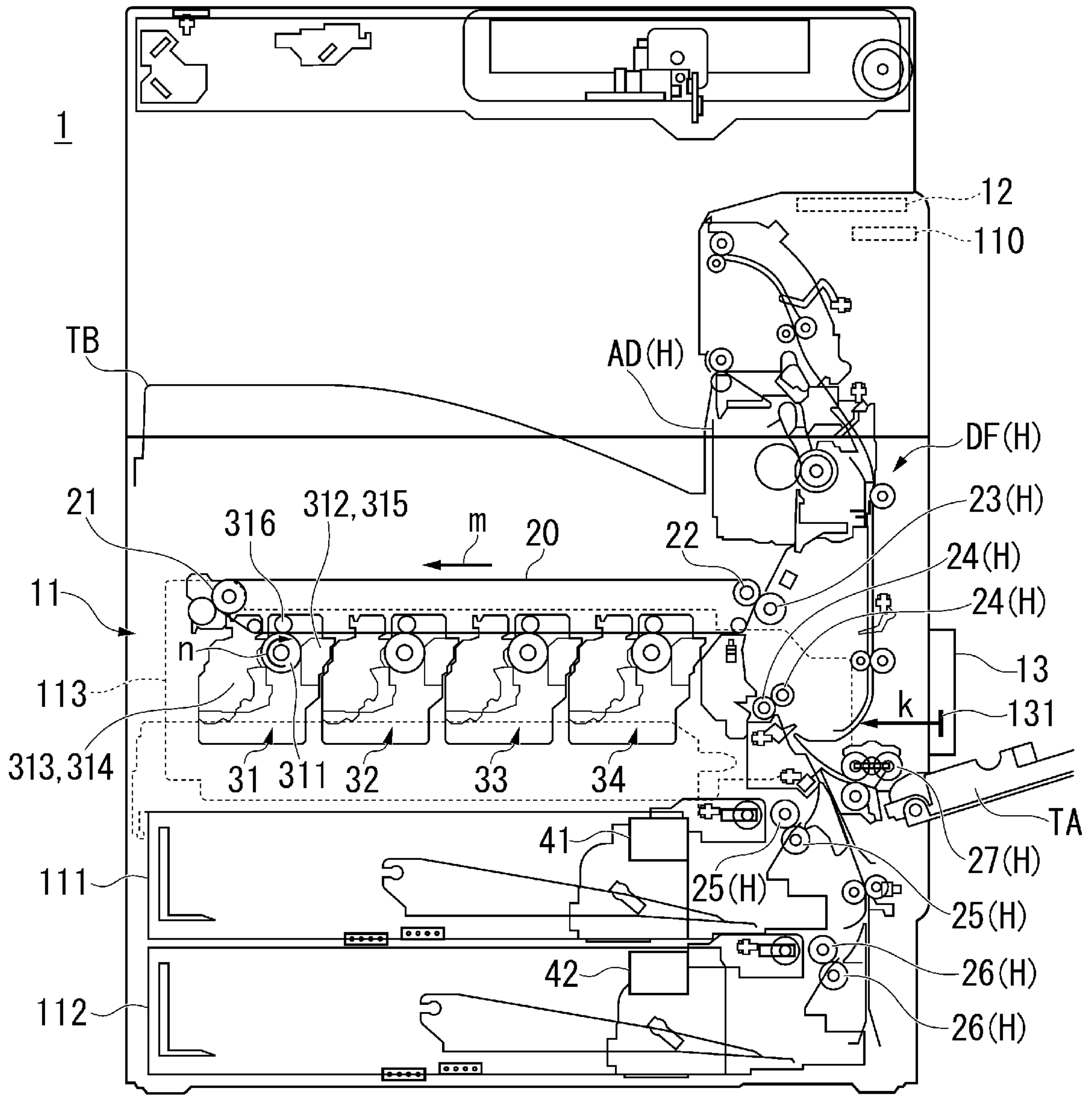
FIG. 1 is a diagram illustrating an example of a configuration of an image forming apparatus of an embodiment.

An image forming apparatus according to an embodiment will be described with reference to the drawings. In each figure, the same reference numeral is attached to the same configuration. An image forming apparatus 1 will be described as an example of the image forming apparatus according to the embodiment.

(Configuration of Image Forming Apparatus)

With reference to FIG. 1, a configuration of the image forming apparatus 1 will be described. FIG. 1 is a diagram illustrating an example of the configuration of the image forming apparatus 1 of the embodiment.

The image forming apparatus 1 is an apparatus that forms an image on the print medium. For example, the image forming apparatus 1 is a multifunction machine, a copier, a printer, or the like.

The print medium is a medium to be subjected to processing such as image formation performed by the image forming apparatus 1. The print medium may be any sheet-like medium on which an image can be formed on at least one of a front surface and a back surface. For example, the print medium is printing paper, plastic film, or the like. The front surface of the print medium is a surface predetermined as a surface on a front side of two surfaces of the print medium. The back surface of the print medium is a surface predetermined as a surface on a back side of the two sides of the print medium.

The print medium is classified according to a size of the print medium, a thickness of the print medium, a material of the print medium, and presence/absence of a wireless tag.

The wireless tag is, for example, a radio frequency identification (RFID) tag, but is not limited thereto.

A print medium not having a wireless tag is a print medium with no wireless tag attached thereto.

Figure 2:
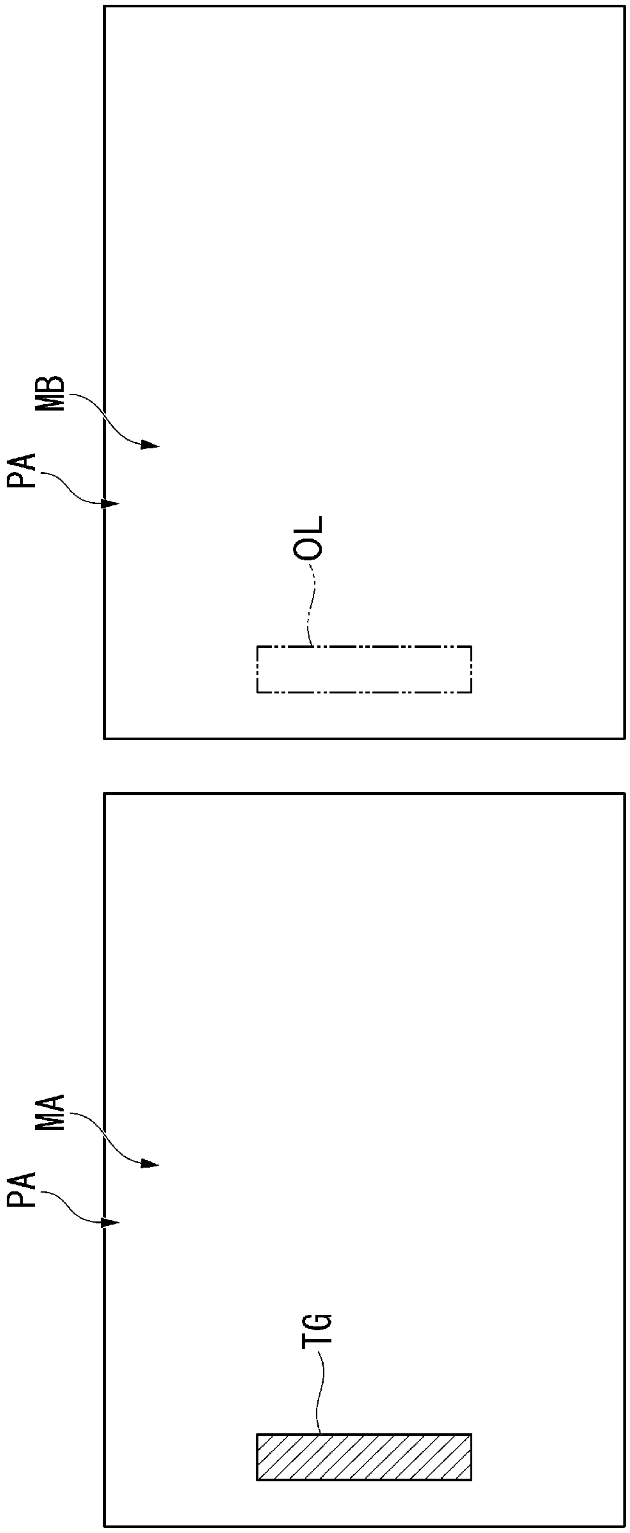
FIG. 2 is a diagram illustrating an example of each of a front surface and a back surface of a print medium on which a wireless tag is attached.

On the other hand, a print medium having the wireless tag is a print medium with one or more wireless tags attached to either one of a front surface and a back surface thereof. As an example, a case where the print medium having the wireless tag is the print medium with one or more wireless tags attached to the back surface thereof will be described. FIG. 2 is a diagram illustrating an example of each of the front surface and the back surface of the print medium with the wireless tag attached thereto. A print medium PA illustrated in FIG. 2 is an example of the print medium having the wireless tag. A first surface MA of the surfaces of the print medium PA illustrated in FIG. 2 is an example of the back surface of the print medium PA. On the other hand, a second surface MB of the surfaces of the print medium PA illustrated in FIG. 2 is an example of the front surface of the print medium PA. As illustrated in FIG. 2, a wireless tag TG is attached to the back surface of the print medium PA. On the other hand, no wireless tag TG is attached to the front surface of the print medium PA. A two-dot chain line OL illustrated in FIG. 2 indicates an outline of the wireless tag TG attached to the first surface MA, which is the back side of the second surface MB.

The print medium having one or more wireless tags, such as the print medium PA, is further classified according to a position of each of the one or more wireless tags on the print medium. Therefore, wireless tag position information indicating the position of each of one or more wireless tags on the print medium is formed on the front surface or the back surface of the print medium having the one or more wireless tags.

If the wireless tag position information indicating the position of a wireless tag is formed on the front surface of a print medium having the wireless tag, the wireless tag position information is desirably formed to be erased by heating, pressurization, or the like. This is because an image formed on the print medium by the image forming apparatus 1 is superimposed on the wireless tag position information. For example, the wireless tag position information is formed on the front surface of the print medium so as to be erased by heating if the image forming apparatus 1 forms an image on the print medium by forming the wireless tag position information with decolorable toner. A method of forming the wireless tag position information on the print medium to be erased by heating, pressurization, or the like may be a known method or a method to be developed in the future.

On the other hand, if wireless tag position information indicating a position of a wireless tag is formed on the back surface of the print medium having the wireless tag, the wireless tag position information may be formed to be erased by heating, pressurization, or the like, or may be formed so as not to be erased.

The wireless tag position information indicating the position of a wireless tag on a print medium having the wireless tag may be any information as long as the wireless tag position information can indicate the position of the wireless tag on the print medium. For example, the wireless tag position information may be graphics, characters, numbers, and the like that indicate the position, may be a bar code, QR code (registered trademark), and the like that indicates the position, and may be a color code or the like that indicates the position.

The image forming apparatus 1 specifies a type of the print medium which is subjected to processing to be performed desired by the user, according to an operation received from the user. After specifying the type, the image forming apparatus 1 forms an image on a pre-specified type of print medium in accordance with an operation received from the user.

For example, if the pre-specified type of print medium is a first print medium PRA, the image forming apparatus 1 forms an image on the first print medium PRA in accordance with an operation received from the user. In this example, the first print medium PRA is a print medium that is A4 size plain paper and has two wireless tags. On the other hand, for example, if the pre-specified type of print medium is a second print medium PRB, the image forming apparatus 1 forms an image on the second print medium PRB according to the operation. In this example, the second print medium PRB is a print medium that is A4 size thick paper and does not have a wireless tag.

The image forming apparatus 1 detects the wireless tag position information formed on the print medium according to an operation received from the user if the pre-specified type of print medium is the print medium having the wireless tag. With this configuration, the image forming apparatus 1 can determine whether or not an error is present in the front and back sides of the print medium on which the image is to be formed. For example, if the wireless tag position information formed on the print medium cannot be detected, the image forming apparatus 1 determines that an error is present in the front and back sides of the print medium on which the image is to be formed. In this case, the image forming apparatus 1 displays, for example, information indicating that an error is present in the front and back sides of the print medium on which the image is to be formed. With this configuration, the image forming apparatus 1 can prevent failure in forming an image at a desired position on the print medium having the wireless tag. On the other hand, for example, if the wireless tag position information formed on the print medium can be detected, the image forming apparatus 1 determines that an error is not present in the front and back sides of the print medium on which the image is to be formed. In this case, the image forming apparatus 1 determines, based on the detected wireless tag position information, whether or not the position and number of wireless tags that the print medium has match the position and number of wireless tags that the pre-specified type of print medium has. If it is determined that the positions and numbers of these wireless tags match, respectively, the image forming apparatus 1 forms an image on the print medium on which the image is to be formed. On the other hand, if it is determined that the positions and numbers of these wireless tags do not match, respectively, the image forming apparatus 1 displays information indicating that the positions and numbers of these wireless tags do not match, respectively. With this configuration, the image forming apparatus 1 can prevent images from being formed on a different type of print medium.

The image forming apparatus 1 writes tag information to each of one or more wireless tags when forming an image on a print medium having the one or more wireless tags. For example, if the pre-specified type of print medium is the first print medium PRA, the image forming apparatus 1 writes tag information to each of the two wireless tags attached to the first print medium PRA.

The image forming apparatus 1 includes, for example, a printer unit 11, a control panel 12, a wireless tag communication device 13, a manual feed tray TA, and a paper discharge tray TB. The image forming apparatus 1 may be configured to include other members, other devices, and the like in addition to the printer unit 11, the control panel 12, the wireless tag communication device 13, the manual feed tray TA, and the paper discharge tray TB. The image forming apparatus 1 may be configured without the wireless tag communication device 13. In this case, an external device corresponding to the wireless tag communication device 13 is attached to the image forming apparatus 1 from the outside.

The printer unit 11 includes a control unit 110, a paper feed cassette 111, a paper feed cassette 112, and an image forming unit 113.

The control unit 110 controls the entire image forming apparatus 1. In other words, the control unit 110 controls each of the printer unit 11, the control panel 12, the wireless tag communication device 13, and the image forming unit 113. In FIG. 1, the control unit 110 is illustrated at a position different from an actual position thereof for simplification of the drawing.

The paper feed cassette 111 stores a type of print medium desired by the user. As an example, a case where the first print medium PRA is stored in the paper feed cassette 111 will be described.

The paper feed cassette 112 stores a type of print media desired by the user. As an example, a case where the paper feed cassette 112 stores the second print medium PRB will be described.

The control panel 12 includes an operation reception unit and a display unit. In FIG. 1, the control panel 12 is illustrated at a position different from an actual position thereof for simplification of the drawing.

The operation reception unit receives an operation from the user. The operation reception unit is an input device, for example, a touch pad, an input key, or the like. The operation reception unit outputs information indicating the operation received from the user to the control unit 110.

The display unit displays an image according to the operation received via the operation reception unit. The display unit is an image display device, for example, a liquid crystal display, an organic electro luminescence (EL) display, or the like. The display unit may be configured integrally with the operation reception unit as a touch panel.

The image forming unit 113, according to the control from the control unit 110, conveys the print medium and forms an image indicated by image data acquired from the control unit 110 on the print medium. Details of the configuration of the image forming unit 113 will be described later.

The wireless tag communication device 13 includes an antenna 131 that radiates radio waves to a predetermined radiation area among areas on a conveyance path through which the print medium passes by conveyance by the image forming unit 113.

The antenna 131 is, for example, an antenna that radiates radio waves to the radiation area. The antenna 131 may be configured with a single antenna, or may be configured with a plurality of antennas. An arrow k illustrated in FIG. 1 indicates an example of a direction in which radio waves are radiated from the antenna 131.

The wireless tag communication device 13 causes the antenna 131 to radiate radio waves according to the control from the control unit 110. With this configuration, the wireless tag communication device 13 can write the tag information to each wireless tag of the print medium having one or more wireless tags. A method of writing tag information to the wireless tag may be a known method or a method to be developed in the future. A configuration in which the writing of the tag information to the wireless tag by the image forming apparatus 1 includes a verify operation in which the image forming apparatus 1 verifies whether or not the writing of the tag information is performed normally may be adopted.

(Configuration of Image Forming Unit)

A configuration of the image forming unit 113 will be described below.

The image forming unit 113 includes an intermediate transfer belt 20, a driven roller 21, a backup roller 22, and a secondary transfer roller 23. The image forming unit 113 includes two registration rollers 24, two first paper feed rollers 25, two second paper feed rollers 26, and a manual paper feed roller 27. The image forming unit 113 includes four sets of image forming stations including an image forming station 31, an image forming station 32, an image forming station 33, and an image forming station 34. The image forming unit 113 includes a fixing device AD and a duplex printing device DF. The image forming unit 113 includes a first detection unit 41 and a second detection unit 42.

The intermediate transfer belt 20 is a belt onto which toner images are primarily transferred by the four sets of image forming stations. The intermediate transfer belt 20 is supported by the driven roller 21, the backup roller 22, and the like. The intermediate transfer belt 20 rotates in a direction indicated by an arrow m in FIG. 1. More specifically, the image forming unit 113 rotates the intermediate transfer belt 20 in the direction indicated by the arrow m by a motor (not illustrated) according to the control from the control unit 110.

The image forming station 31 is an image forming station for yellow (Y) image formation. The image forming station 32 is an image forming station for magenta M image formation. The image forming station 33 is an image forming station for cyan (C) image formation. The image forming station 34 is an image forming station for black (K) image formation. In the image forming unit 113, these four sets of image forming stations are disposed below the intermediate transfer belt 20 along the rotation direction of the intermediate transfer belt 20.

The image forming station 31 includes a photoreceptor drum 311, an electrifying charger 312, an exposure scanning head 313, a developing device 314, a photoreceptor cleaner 315, and a primary transfer roller 316. In the image forming station 31, the electrifying charger 312, the exposure scanning head 313, the developing device 314, the photoreceptor cleaner 315, and the primary transfer roller 316 are disposed around the photoreceptor drum 311 rotating in the direction indicated by an arrow n in FIG. 1. The primary transfer roller 316 faces the photoreceptor drum 311 with the intermediate transfer belt 20 interposed therebetween. In FIG. 1, the electrifying charger 312 is drawn as an integrated member with the photoreceptor cleaner 315 in order to avoid complicating the drawing. In FIG. 1, the exposure scanning head 313 is drawn as an integral member with the developing device 314 in order to avoid complicating the drawing.

The configuration of each of the image forming station 32, the image forming station 33, and the image forming station 34 is similar to that of such an image forming station 31. Therefore, in the following, descriptions of the configurations of the image forming station 32, the image forming station 33, and the image forming station 34 are omitted.

The secondary transfer roller 23 faces the backup roller 22 with the intermediate transfer belt 20 interposed therebetween. The secondary transfer roller 23 secondarily transfers the toner image, which is primarily transferred onto the intermediate transfer belt 20, onto the print medium passing between the secondary transfer roller 23 and the intermediate transfer belt 20.

The two registration rollers 24 convey the print medium conveyed by each paper feed roller between the secondary transfer roller 23 and the intermediate transfer belt 20. Specifically, the two registration rollers 24 convey the print medium, which is conveyed from the paper feed cassette 111 through the first paper feed rollers 25, between the secondary transfer roller 23 and the intermediate transfer belt 20. The two registration rollers 24 convey the print medium, which is conveyed from the paper feed cassette 112 through the second paper feed rollers 26, between the secondary transfer roller 23 and the intermediate transfer belt 20. The two registration rollers 24 convey each print medium, which is conveyed from the manual feed tray TA through the manual paper feed roller 27, between the secondary transfer roller 23 and the intermediate transfer belt 20.

The two first paper feed rollers 25 convey the print medium, which is picked up by a pickup roller that picks up the print medium from the paper feed cassette 111, between the two registration rollers 24.

The two second paper feed rollers 26 convey the print medium, which is picked up by the pickup roller that picks up the print medium from the paper feed cassette 112, between the two registration rollers 24.

The manual paper feed roller 27 picks up the print medium from the manual feed tray TA and conveys the print medium to the two registration rollers 24.

The fixing device AD is a device that fixes the toner image on the print medium onto which the toner image is secondarily transferred by the secondary transfer roller 23. More specifically, the fixing device AD heats and pressurizes the print medium while conveying the print medium by the rollers. With this configuration, the fixing device AD fixes the toner image, which is secondarily transferred onto the print medium, onto the print medium. As a result, an image is formed on the print medium. Furthermore, if the wireless tag position information attached to a certain print medium is formed with decolorable toner, the wireless tag position information is erased by heating the print medium by the fixing device AD.

The duplex printing device DF is a device that conveys the print medium with an image formed on the front surface thereof by the fixing device AD to the two registration rollers 24. The print medium of which the front surface and the back surface are turned over is conveyed to the duplex printing device DF. Therefore, the image is formed on the back surface of the print medium, which is conveyed between the two registration rollers 24 through the duplex printing device DF, via the secondary transfer roller 23 and the fixing device AD.

The first detection unit 41 is a sensor that detects each of one or more pieces of wireless tag position information formed on the print medium conveyed from the paper feed cassette 111. The first detection unit 41 may have any configuration as long as the first detection unit 41 can detect the one or more pieces of wireless tag position information. For example, if the wireless tag position information is a QR code (registered trademark), the first detection unit 41 is a QR code reader, a camera, or the like. For example, if the wireless tag position information is a barcode (registered trademark), the first detection unit 41 is a barcode reader, a camera, or the like. For example, if the wireless tag position information is composed of a plurality of straight lines as described later, the first detection unit 41 is a line sensor, a camera, or the like.

For example, as illustrated in FIG. 1, the first detection unit 41 is provided at a position where the wireless tag position information can be detected while the print medium is conveyed from the paper feed cassette 111 by the first paper feed roller 25.

The second detection unit 42 is a sensor that detects each of one or more pieces of wireless tag position information formed on the print medium conveyed from the paper feed cassette 112. The second detection unit 42 may have any configuration as long as the second detection unit 42 can detect the one or more pieces of wireless tag position information. As an example, a case where the configuration of the second detection unit 42 is the same as the configuration of the first detection unit 41 will be described.

For example, as illustrated in FIG. 1, the second detection unit 42 is provided at a position where the wireless tag position information can be detected while the print medium is conveyed from the paper feed cassette 112 by the second paper feed roller 26.

(Operation of Image Forming Unit)

An operation of the image forming unit 113 will be described below.

First, taking an operation of the image forming station 31 as an example, the operation of the four sets of image forming stations will be described.

The image forming station 31 charges the photoreceptor drum 311 with the electrifying charger 312 and then exposes the photoreceptor drum 311 with the exposure scanning head 313. With this configuration, the image forming station 31 forms an electrostatic latent image on the photoreceptor drum 311. After that, the image forming station 31 causes the developing device 314 to develop the electrostatic latent image on the photoreceptor drum 311. The developing device 314 develops the electrostatic latent image on the photoreceptor drum 311 as a toner image using a two-component developer formed of toner and carrier. The primary transfer roller 316 primarily transfers the toner image thus formed on the photoreceptor drum 311 onto the intermediate transfer belt 20. After this primary transfer is performed, the photoreceptor cleaner 315 removes toner remaining on the photoreceptor drum 311.

Each of the image forming station 31, the image forming station 32, the image forming station 33, and the image forming station 34 forms a color toner image on the intermediate transfer belt 20 by the primary transfer roller 316. The color toner image is formed by sequentially superimposing yellow (Y), magenta M, cyan (C), and black (K) toner images.

Next, an operation of the secondary transfer roller 23 will be described. The secondary transfer roller 23 collectively transfers the color toner images on the intermediate transfer belt 20 onto the print medium passing between the secondary transfer roller 23 and the intermediate transfer belt 20. In the following description, the term "toner image" may refer to either a color toner image or a single-color toner image. The toner image may be a toner image using decolorable toner.

Next, among operations of the image forming unit 113, an operation of conveying the print medium will be described.

In a nip of the two registration rollers 24, the print medium conveyed from each of the paper feed cassette 111, the paper feed cassette 112, and the manual feed tray TA is bent. With this configuration, a position of a leading edge of the print medium is aligned. A leading edge of a certain print medium is an end part in the conveyance direction in which the print medium is conveyed among end parts of the print medium. After the position of the leading edge of the print medium is aligned, the two registration rollers 24 convey the print medium between the secondary transfer roller 23 and the intermediate transfer belt 20 in accordance with the timing at which the image forming unit 113 transfers the toner image onto the print medium.

In the image forming unit 113, the print medium is conveyed along a predetermined conveyance path by the two registration rollers 24, the fixing device AD, and a plurality of rollers in the duplex printing device DF.

The two registration rollers 24 start rotating in line with the position of the toner image on the rotating intermediate transfer belt 20, and move the print medium to the position of the secondary transfer roller 23. With this configuration, the toner image formed on the intermediate transfer belt 20 is secondarily transferred onto the print medium by the secondary transfer roller 23. After the toner image is secondarily transferred onto the print medium, the secondary transfer roller 23 conveys the print medium to the fixing device AD along a predetermined conveyance path. The fixing device AD fixes the toner image, which is secondarily transferred onto the print medium conveyed from the secondary transfer roller 23, onto the print medium while conveying the print medium. With this configuration, the secondarily transferred toner image is formed as an image on the print medium. The print medium on which the image is formed by the fixing device AD is discharged to the paper discharge tray TB by rollers (not illustrated).

In the case of duplex printing, the print medium with the image formed on the front surface thereof is switched back by a roller (not illustrated) and the front surface and the back surface thereof are turned over. After that, the plurality of rollers in the duplex printing device DF convey the print medium to the nip of two registration rollers 24. The print medium of which the front surface and the back surface are turned over is conveyed to the fixing device AD via the two registration rollers 24, and the toner image is fixed by the fixing device AD. With this configuration, an image is formed on the back surface of the print medium. The print medium with the image formed on the back surface thereof by the fixing device AD is discharged to the paper discharge tray TB by rollers (not illustrated).

As described above, the secondary transfer roller 23, the two registration rollers 24, the first paper feed rollers 25, the second paper feed rollers 26, the manual paper feed roller 27, and the various rollers in the fixing device AD and duplex printing device DF constitute a conveyance unit H for conveying the print medium in the image forming apparatus 1. A configuration in which the conveyance unit H includes at least one of the pickup roller of the paper feed cassette 111 and the pickup roller of the paper feed cassette 112 may be adopted. A configuration in which the conveyance unit H includes other rollers may be adopted.

(Configuration Example of Wireless Tag Position Information and Method of Specifying Position of Wireless Tag)

Figure 3:
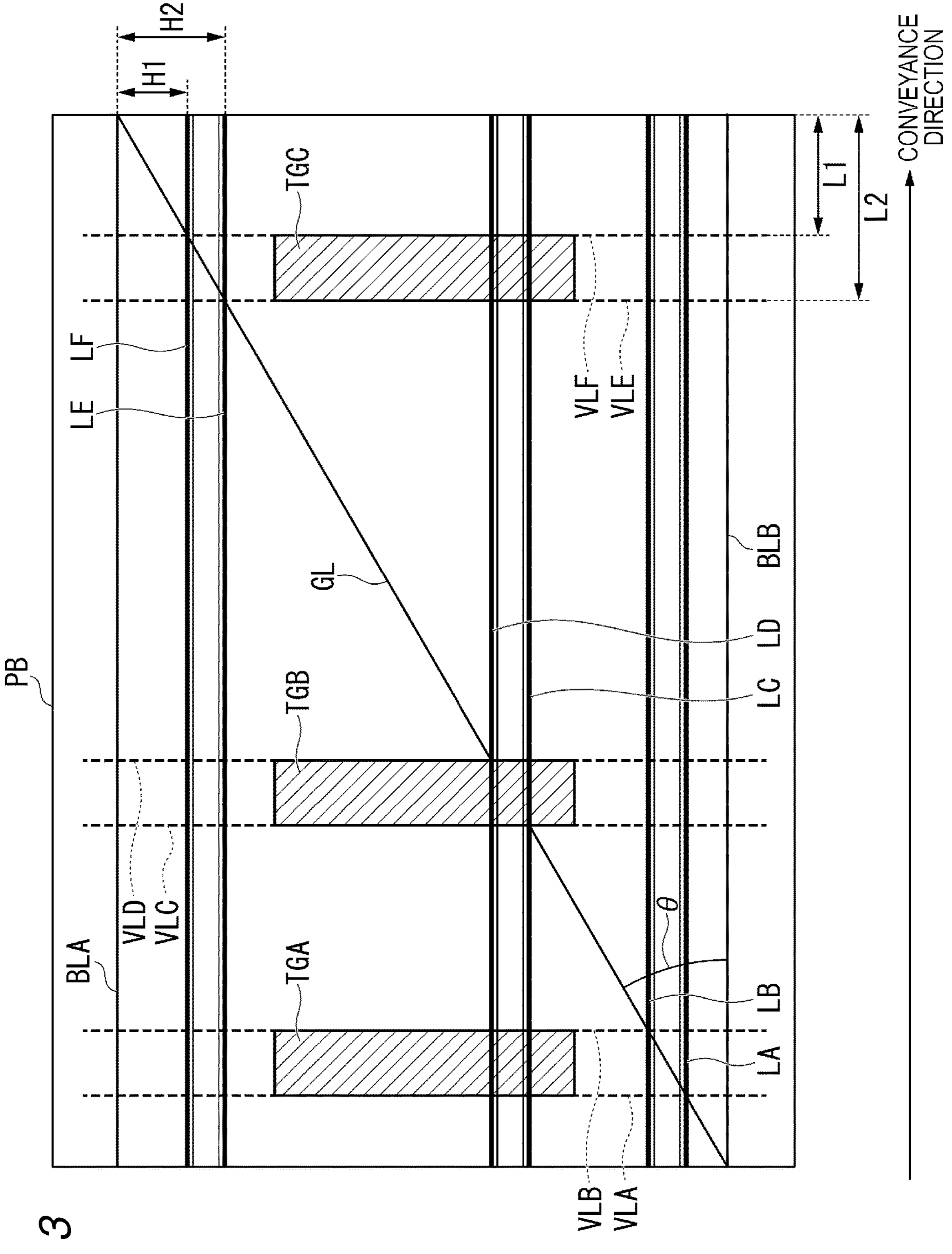
FIG. 3 is a diagram illustrating an example of configuration of the front surface of the print medium on which wireless tag position information is formed.

With reference to FIG. 3, a configuration example of the wireless tag position information will be described. For example, FIG. 3 is a diagram illustrating an example of a configuration of the back surface of the print medium on which the wireless tag position information is formed. A print medium PB illustrated in FIG. 3 is an example of the print medium on which the wireless tag position information is formed. Three wireless tags of a wireless tag TGA, a wireless tag TGB, and a wireless tag TGC are attached to the print medium PB. In the example illustrated in FIG. 3, the wireless tag position information is composed of a plurality of straight lines indicating a position of each of these three wireless tags. In this case, the distances from the leading edge of the print medium, to which a wireless tag is attached, to a leading edge and a trailing edge of the wireless tag are specified by the image forming apparatus 1 as the position of the wireless tag on the print medium. The leading edge of the wireless tag is an end part in the conveyance direction among the end parts of the wireless tag. The trailing edge of the wireless tag is an end part of the wireless tag in the direction opposite to the conveyance direction among the end parts of the wireless tag.

The wireless tag position information formed on the print medium PB includes two reference lines extending in the longitudinal direction of the print medium and a guide line obliquely crossing the two reference lines. Each of a reference line BLA and a reference line BLB illustrated in FIG. 3 is an example of the two reference lines. On the front surface of the print medium PB, the reference line BLA is a straight line parallel to the conveyance direction. In FIG. 3, the conveyance direction in the image forming apparatus 1 is indicated by an arrow. On the other hand, on the front surface of the print medium PB, the reference line BLB is also a straight line parallel to the conveyance direction. The reference line BLA and the reference line BLB in the direction perpendicular to the conveyance direction are spaced apart by a predetermined distance on the print medium PB. The predetermined distance is, for example, 171.47 mm, but is not limited thereto. In the example illustrated in FIG. 3, the reference line BLA and the reference line BLB are spaced apart from both the left and right ends of the print medium PB, by equal distance respectively, but a configuration in which the reference lines BLA and BLB are spaced apart from both the left and right ends of the print medium PB by different distances may be adopted. The guide line GL illustrated in FIG. 3 is an example of the guide line. On the front surface of the print medium PB, the guide line GL is a straight line obliquely crossing each of the reference line BLA and the reference line BLB at a predetermined angle θ. In the example illustrated in FIG. 3, the guide line GL is a straight line connecting the leading edge of the reference line BLA and the trailing edge of the reference line BLB. The leading edge of the reference line BLA is an end part in the conveyance direction among end parts of the reference line BLA. The trailing edge of the reference line BLB is an end part of the reference line BLB in the direction opposite to the conveyance direction among end parts of the reference line BLB. The predetermined distance and predetermined angle θ are predetermined. For example, if a detected predetermined distance is 171.47 mm, the image forming apparatus 1 specifies that the size of the print medium PB is A4 size based on the predetermined angle θ. Specifying the size of the print medium PB is used to detect whether or not the print medium is a print medium on which a position of the wireless tag position information can be detected by each of the first detection unit 41 and the second detection unit 42. That is, by specifying the size of the print medium PB as described above, the image forming apparatus 1 can detect whether or not the print medium is the print medium on which the position of the wireless tag position information can be detected by each of the first detection unit 41 and the second detection unit 42.

The wireless tag position information formed on the print medium PB further includes two straight lines associated with the wireless tag TGA, two straight lines associated with the wireless tag TGB, and two straight lines associated with the wireless tag TGC. These six straight lines are straight lines of different line types from the two reference lines. This is because the image forming apparatus 1 distinguishes between the six straight lines and the two reference lines. In the example illustrated in FIG. 3, each of the six straight lines is indicated by a double line consisting of a pair of thick and thin lines. The two straight lines associated with the wireless tag TGA are formed on the print medium PB such that the thin lines forming the double line face each other. The two straight lines associated with the wireless tag TGB are formed on the print medium PB such that the thin lines forming the double line face each other. The two straight lines associated with the wireless tag TGC are formed on the print medium PB such that the thin lines forming the double line face each other. For example, the image forming apparatus 1 can detect that the two straight lines associated with the wireless tag TGA are paired. As a result, the image forming apparatus 1 can detect that the two straight lines are a combination of the straight lines associated with any one of the wireless tags TGA to TGC. The same applies to the two straight lines associated with each of the wireless tag TGB and the wireless tag TGC. The line types of these six straight lines may be other line types distinguishable from the two reference lines instead of such double lines.

One of the two straight lines associated with the wireless tag TGA is a straight line LA that passes through a point where a virtual straight line VLA including a trailing edge of the wireless tag TGA and the guide line GL intersect and is parallel to the reference line BLA and the reference line BLB. The other of the two straight lines associated with the wireless tag TGA is a straight line LB that passes through a point where a virtual straight line VLB including a leading edge of the wireless tag TGA and the guide line GL intersect and is parallel to the reference line BLA and the reference line BLB. One of the two straight lines associated with the wireless tag TGB is a straight line LC that passes through a point where a virtual straight line VLC including a trailing edge of the wireless tag TGB and the guide line GL intersect and is parallel to the reference line BLA and the reference line BLB. The other of the two straight lines associated with the wireless tag TGB is a straight line LD that passes through a point where a virtual straight line VLD including a leading edge of the wireless tag TGB and the guide line GL intersect and is parallel to the reference line BLA and the reference line BLB. One of the two straight lines associated with the wireless tag TGC is a straight line LE that passes through a point where a virtual straight line VLE including a trailing edge of the wireless tag TGC and the guide line GL intersect and is parallel to the reference line BLA and the reference line BLB. The other of the two straight lines associated with the wireless tag TGC is a straight line LF that passes through a point where a virtual straight line VLF including a leading edge of the wireless tag TGC and the guide line GL intersect and is parallel to the reference line BLA and the reference line BLB. As described above, in FIG. 3, the six straight lines of the straight line LA, straight line LB, straight line LC, straight line LD, straight line LE, straight line LF are formed on the print medium PB as thicker lines than the two reference lines BLA and BLB.

The image forming apparatus 1 can specify the position of the wireless tag TGA on the print medium PB based on the reference line BLA, the reference line BLB, the straight line LA, the straight line LB, and the predetermined angle θ included in the print medium PB. The image forming apparatus 1 can specify the position of the wireless tag TGB on the print medium PB based on the reference line BLA, the reference line BLB, the straight line LC, the straight line LD, and the predetermined angle θ included in the print medium PB. The image forming apparatus 1 can specify the position of the wireless tag TGC on the print medium PB based on the reference line BLA, the reference line BLB, the straight line LE, the straight line LF, and the predetermined angle θ included in the print medium PB.

As an example, a method of specifying the position of the wireless tag TGC on the print medium PB illustrated in FIG. 3 will be described. Since each of the method of specifying the position of the wireless tag TGA on the print medium PB and the method of specifying the position of the wireless tag TGB on the print medium PB is the same as the method of specifying the position of the wireless tag TGC on the print medium PB, detailed description thereof will be omitted. When specifying the position of the wireless tag TGC on the print medium PB, the image forming apparatus 1 detects a reference line, which is closer to the two straight lines associated with the wireless tag TGC, of the reference line BLA or the reference line BLB. For convenience of description, the straight line closer to the two straight lines will be referred to as a near reference line. In the example illustrated in FIG. 3, the near reference line is the reference line BLA. After detecting the near reference line, the image forming apparatus 1 detects a length between the detected near reference line and each of the two straight lines. The distance between the near reference line and one of the two straight lines is a length of a virtual straight line connecting the near reference line and the one straight line at the shortest distance. The distance between the near reference line and the other of the two straight lines is a length of a virtual straight line connecting the near reference line and the other straight line at the shortest distance. A length Hi illustrated in FIG. 3 is an example of the length between the reference line BLA, which is an example of the near reference line, and the straight line LF, which is an example of the one straight line. A length H2 illustrated in FIG. 3 is an example of the length between the reference line BLA, which is an example of the near reference line, and the straight line LE, which is an example of the other straight line. On the other hand, a length L1 illustrated in FIG. 3 is an example of the length of the virtual straight line connecting the leading edge of the print medium PB to the leading edge of the wireless tag TGC at the shortest distance. A length L2 illustrated in FIG. 3 is an example of the length of a virtual straight line connecting the leading edge of the print medium PB to the trailing edge of the wireless tag TGC at the shortest distance. That is, the length L1 and the length L2 are lengths specified by the image forming apparatus 1 as the position of the wireless tag TGC on the print medium PB. The length L1 is geometrically related to the length H1 by Equation (1) below. The length L2 is geometrically related to the length H2 by Equation (2) below.

$$L1=H1/\tan\theta \quad (1)$$

$$L2=H2/\tan\theta \quad (2)$$

Accordingly, the image forming apparatus 1 can specify the length L2 based on the above Equation (1) by detecting the predetermined angle θ and the length H2 between the reference line BLA and the straight line LE. Furthermore, the image forming apparatus 1 can specify the length L1 based on the above Equation (2) by detecting the predetermined angle θ and the length H between the reference line BLA and the straight line LF. In this way, the image forming apparatus 1 can specify the length L1 and the length L2 as the position of the wireless tag TGC on the print medium PB. The image forming apparatus 1 can also specify the respective positions of the wireless tag TGA and the wireless tag TGB on the print medium PB by a similar method. In this way, each of the reference line BLA, the reference line BLB, the guide line GL, the straight line LA, the straight line LB, the straight line LC, the straight line LD, the straight line LE, and the straight line LF illustrated in FIG. 3 is a configuration example of the wireless tag position information indicating the wireless tag position. For convenience of description, the straight line LA, the straight line LB, the straight line LC, the straight line LD, the straight line LE, and the straight line LF will be collectively referred to as straight line LA to straight line LF.

Figure 4:
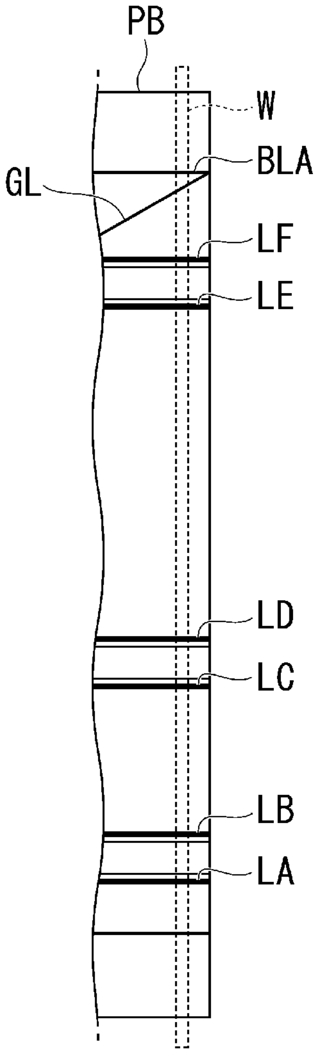
FIG. 4 is an enlarged view of a leading edge of the print medium illustrated in FIG. 3.

The image forming apparatus 1 can, for example, specify the position of the wireless tag by detecting the reference line BLA, the reference line BLB, the guide line GL, and the straight line LA to straight line LF in an area near the leading edge or trailing edge of the print medium PB. FIG. 4 is an enlarged view of the area near the leading edge of the print medium PB illustrated in FIG. 3. For example, the first detection unit 41 may be a line sensor. In this case, for example, the first detection unit 41 scans the area near the leading edge of the print medium PB along a direction orthogonal to the conveyance direction. A dotted frame W illustrated in FIG. 4 is a diagram illustrating an example of an area scanned by the first detection unit 41 in this way. With this configuration, the first detection unit 41 can detect a relative positional relationship between the reference line BLA, the reference line BLB, the guide line GL, and the straight line LA to straight line LF on the print medium PB. In such a case, a configuration in which each of the reference line BLA, the reference line BLB, and the straight line LA to straight line LF is formed in the area near the leading edge of the print medium PB and not formed in other areas of the print medium PB may be adopted. Such circumstances also hold true for the second detection unit 42. A configuration in which each of the reference line BLA, the reference line BLB, the guide line GL, and the straight line LA to straight line LF is formed in the area near the trailing edge of the print medium PB and not formed in other areas of the print medium PB may be adopted. In this case, the first detection unit 41 scans the area near the trailing edge of the print medium PB along the direction orthogonal to the conveyance direction.

Information indicating a result of scanning by each of the first detection unit 41 and the second detection unit 42 is output to the control unit 110. The control unit 110 detects lengths such as the length Hi and the length H2 based on the information indicating the result of scanning by each of the first detection unit 41 and the second detection unit 42. Then, the control unit 110 specifies the position of each wireless tag on the print medium PB based on the detected length and the predetermined angle θ. The method in which the control unit 110 detects each of the lengths such as the length Hi and the length H2 based on the information may be a known method or may be a method to be developed in the future.

In addition to specifying the position of such a wireless tag, the control unit 110 detects the distance between the reference line BLA and the reference line BLB and the predetermined angle θ based on the information indicating the result of scanning by each of the first detection unit 41 and the second detection unit 42. With this configuration, the control unit 110 specifies the size of the print medium PB as described above.

(Functional Configuration of Control Unit)

Figure 5:
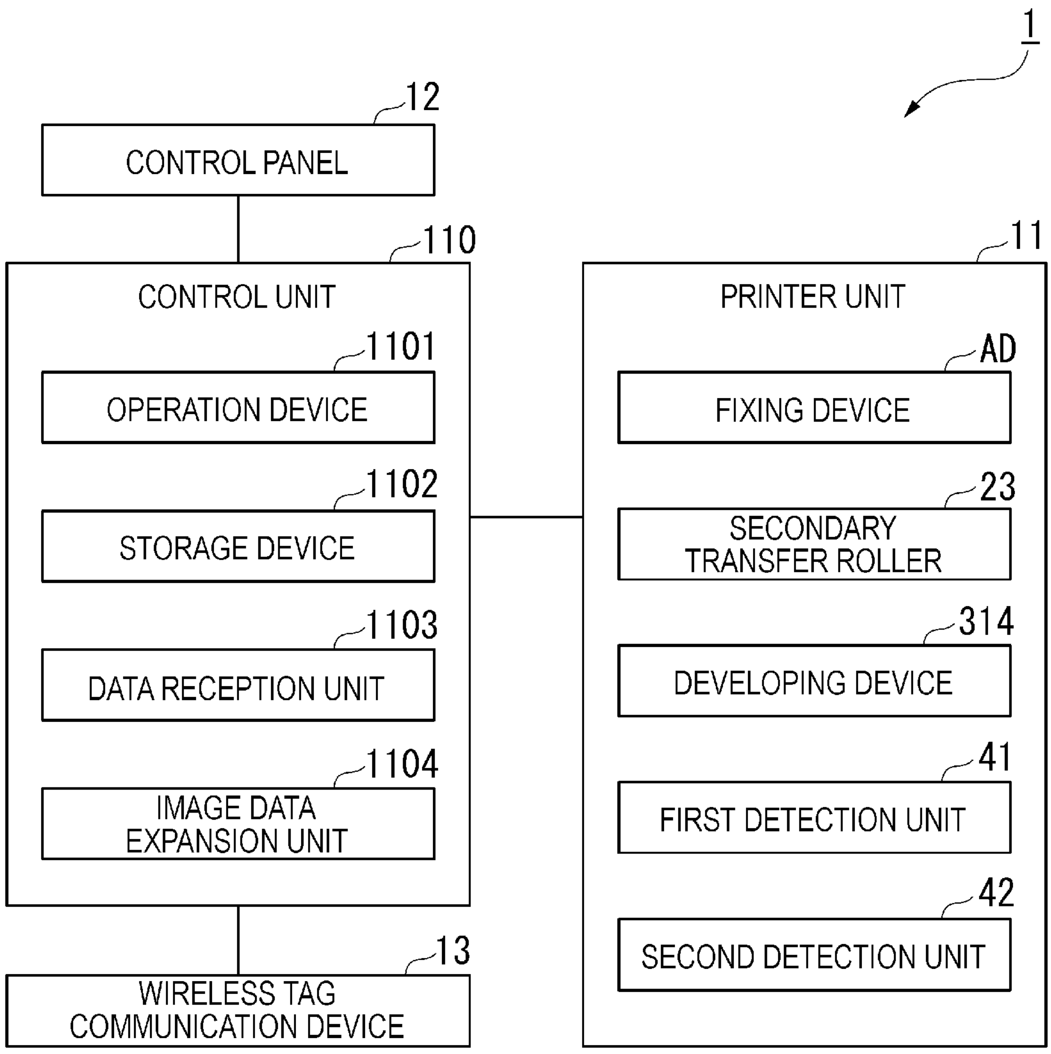
FIG. 5 is a diagram illustrating an example of a functional configuration of a control unit.

Next, with reference to FIG. 5, the functional configuration of the control unit 110 will be described. FIG. 5 is a diagram illustrating an example of the functional configuration of the control unit 110.

As illustrated in FIG. 5, the control unit 110 is communicably connected to each of the printer unit 11, the control panel 12, and the wireless tag communication device 13. The control unit 110 includes an operation device 1101, a storage device 1102, a data reception unit 1103, and an image data expansion unit 1104.

The operation device 1101 is, for example, a central processing unit (CPU), an application specific integrated circuit (ASIC), or the like. The operation device 1101 controls each of the printer unit 11, the control panel 12, and the wireless tag communication device 13 according to an image processing program stored in the storage device 1102.

The storage device 1102 is a read only memory (ROM), a random access memory (RAM), a hard disk drive (HDD), a solid state drive (SSD), or the like. The storage device 1102 may be separate from the control unit 110. The storage device 1102 is an example of a storage unit.

The data reception unit 1103 receives print data (for example, data written in a page description language, and the like) representing an image to be printed from a host such as a personal computer (PC), and stores the received print data in the storage device 1102.

The image data expansion unit 1104 determines print conditions from the print data stored in the storage device 1102 by the data reception unit 1103, expands the data into data that can be printed by the printer unit 11 (for example, raster data, and the like), and stores the data in the storage device 1102.

(Process of Forming Image on Print Medium by Image Forming Apparatus)

Figure 6:
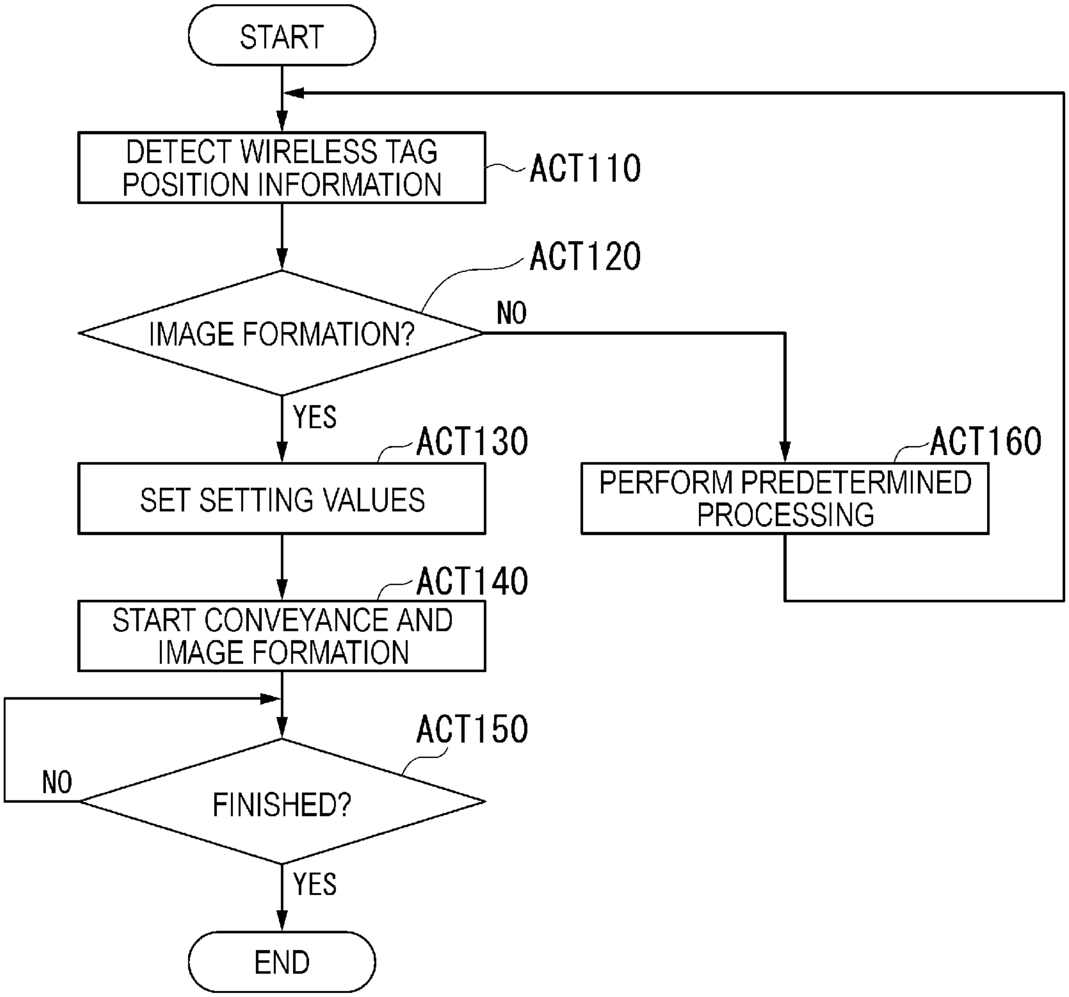
FIG. 6 is a diagram illustrating an example of a flow of a process in which the image forming apparatus forms an image on the print medium.

With reference to FIG. 6, a process of forming an image on the print medium by the image forming apparatus 1 will be described. FIG. 6 is a diagram illustrating an example of a flow of a process in which the image forming apparatus 1 forms an image on the print medium. As an example, description will be made on a case where the image forming apparatus 1 receives a request to cause the image forming apparatus 1 to form the image on the print medium at a timing before processing in ACT 110 illustrated in FIG. 6 is performed. As an example, description will be made on a case where the image forming apparatus 1 receives an operation of designating the type of the print medium to be used in forming an image on the print medium according to the request at the timing. For convenience of description, the type of print medium designated by the user through the operation will be referred to as a designated print medium. As an example, description will be made on a case where the print medium to be used in forming the image on the print media according to the request is stored in the paper feed cassette 111. As an example, a case where the designated print medium is the print medium having the wireless tag will be described.

The control unit 110 causes the first detection unit 41 to detect the wireless tag position information formed on the print medium positioned at the top among the print media stored in the paper feed cassette 111 (ACT 110). In FIG. 6, processing in ACT 110 is indicated by "detection". Since the method in which the first detection unit 41 detects the wireless tag position information in ACT 110 is already described, detailed description thereof will be omitted here. In ACT 110, the first detection unit 41 outputs information indicating the detection result to the control unit 110. For convenience of description, the print medium positioned at the top among the print media stored in the paper feed cassette 111 will be referred to as a print medium to be used.

Next, the control unit 110 acquires the information output from the first detection unit 41 in ACT 110, and determines whether or not to form the image on the print medium to be used based on the acquired information (ACT 120). In FIG. 6, processing in ACT 120 is indicated by "image formation?".

The processing in ACT 120 will be described in detail. In ACT 120, the control unit 110 performs processing described below. The control unit 110 determines, based on the information acquired from the first detection unit 41, whether or not the wireless tag position information is detected from the print medium to be used. If it is determined that the wireless tag position information is not detected from the print medium to be used, the control unit 110 determines not to form the image on the print medium to be used. This is because there is a possibility that the print medium to be used is placed on the top of the paper feed cassette 111 with the front and back sides of the print medium to be used turned over. Furthermore, this is because there is a possibility that the print medium not having the wireless tag is placed on the top of the paper feed cassette 111. On the other hand, if it is determined that wireless tag position information is detected from the print medium to be used, the control unit 110 specifies the position and number of one or more wireless tags attached to the print medium to be used and the size of the print medium to be used, based on the wireless tag position information. The control unit 110 specifies the number of combinations of two lengths, which are detected as the position of the wireless tag on the print medium to be used, as the number of wireless tags on the print medium to be used. After specifying the position, number, and size of the one or more wireless tags, the control unit 110 determines whether or not the type of the print medium to be used matches the type of the designated print medium. Specifically, the control unit 110 determines whether or not the specified position and number match the position and number of one or more wireless tags attached to the designated print medium. Furthermore, the control unit 110 determines whether or not the specified size matches the size of the designated print medium. If the result of both of these two determinations is that the specified position and number and specified size match the position and number and the size of one or more wireless tags, the control unit 110 determines that the type of the print medium to be used and the type of the designated print medium match. If it is determined that the type of the print medium to be used does not match the type of the designated print medium, the control unit 110 determines not to form the image on the print medium to be used. However, even if the print medium to be used is placed at the top of the paper feed cassette 111 with the left and right sides of the print medium to be used turned over, the control unit 110 determines that the type of the print medium to be used does not match the type of the designated print medium. This is because, in this case as well, the specified position and number do not match the position and number of one or more wireless tags attached to the designated print medium. The control unit 110 performs processing described above as the processing in ACT 120.

In this way, the image forming apparatus 1 can detect that the type of the print medium to be used and the type of the designated print medium are different, that the front and back sides of the print medium to be used are turned over, that the left and right sides of the print medium to be used is turned over, and the like by processing in ACT 120. As a result, the image forming apparatus 1 can prevent failure in forming the image at a desired position on a desired type of print medium.

If it is determined in ACT 120 that an image is to be formed on the print medium to be used (YES in ACT 120), the control unit 110 sets various setting values (ACT 130). Specifically, in ACT 130, the control unit 110 sets various setting values according to the position of each of one or more wireless tags attached to the print medium to be used. For example, the various setting values include the intensity of radio waves emitted from the antenna 131, the timing of writing tag information to each of the one or more wireless tags, the position at which the print medium to be used is stopped for writing tag information, and the like. For example, the various setting values include a setting value of the fixing device AD according to the presence or absence of the wireless tag, a flag indicating whether or not to reverse the print medium to be used, and the like. For example, the various setting values include the conveyance speed of the print medium to be used by the image forming unit 113 of the image forming apparatus 1, an amount of toner to be transferred onto the print medium to be used by the image forming unit 113, and the like. The conveyance speed of the print medium to be used by the image forming unit 113 may be rephrased as the conveyance speed of the print medium to be used by the conveyance unit H. That is, the control unit 110 changes the conveyance speed of the print medium to be used by the conveyance unit H based on the wireless tag position information detected in ACT 110. This is because the quality of image formation on the print medium to be used can be improved by making the conveyance speed slower as the number of wireless tags attached to the print medium to be used increases. On the other hand, the amount of toner may be rephrased into the thickness of the toner to be transferred onto the print medium to be used. That is, the control unit 110 adjusts the thickness of the toner to be transferred onto the print medium to be used by the image forming unit 113, based on the wireless tag position information detected in ACT 110. This is because if an image is formed on the wireless tag, thickening the toner can prevent image omission from occurring. A configuration in which various setting values include other values may be adopted. For example, a configuration in which the various setting values include a position where the print medium having a wireless tag is temporarily stopped in order to write tag information to the wireless tag of the print medium, the timing of writing the tag information to the wireless tag, and the like may be adopted. For example, a configuration in which the various setting values include the conveyance speed according to the type of the print medium, the set value for the fixing device AD according to the print medium having the wireless tag, the set value for the duplex printing device DF for aligning wireless tag positions, and the like may be adopted.

Next, the control unit 110 starts conveyance of the print medium to be used and formation of the image on the print medium to be used based on the setting values set in ACT 130 (ACT 140).

Next, the control unit 110 waits until both the conveyance of the print medium to be used and the formation of the image on the print medium to be used, which are started in ACT 140, are finished (ACT 150). In FIG. 6, processing in ACT 150 is indicated by "finished?".

If it is determined that both the conveyance of the print medium to be used and the formation of the image on the print medium to be used started in ACT 140 are finished (YES in ACT 150), the control unit 110 ends the process of the flowchart illustrated in FIG. 6.

On the other hand, if it is determined in ACT 120 that no image is to be formed on the print medium to be used (NO in ACT 120), the control unit 110 performs predetermined processing (ACT 160). Specifically, in ACT 160, the control unit 110 performs processing according to the difference between the print medium to be used and the designated print medium as the predetermined processing. For example, if it is determined in ACT 120 that the wireless tag position information is not detected from the print medium to be used, the control unit 110 does not cause the image forming unit 113 to form the image on the print medium to be used, and causes the print medium to be used to be discharged to the paper discharge tray TB. When causing the print medium to be used to be discharged to the paper discharge tray TB, if the image forming apparatus 1 is also provided with a paper discharge tray other than the paper discharge tray TB, the control unit 110 may change a conveyance destination of the print medium to be used, which is not subjected to image formation, to a paper discharge tray different from the designated paper discharge tray. With this configuration, the image forming apparatus 1 can easily inform the user that the wireless tag position information is not detected from the print medium to be used. As a result, the image forming apparatus 1 can make the user aware of the possibility that the print medium to be used is placed on the top of the paper feed cassette 111 with the front and back sides of the print medium to be used turned over, and the possibility that the print medium not having the wireless tag is placed on the top of the paper feed cassette 111. If it is determined in ACT 120 that the wireless tag position information is not detected from the print medium to be used, the image forming apparatus 1 may cause the display unit of the control panel 12 to display information indicating that the wireless tag position information is not detected from the print medium to be used. Also with this configuration, the image forming apparatus 1 can easily inform the user that the wireless tag position information is not detected from the print medium to be used. The control unit 110 similarly performs the processing described above even if it is determined in ACT 120 that the type of the print medium to be used does not match the type of the designated print medium. However, in this case, information to be displayed on the display unit by the control unit 110 is information indicating that the type of the print medium to be used does not match the type of the designated print medium. With this configuration, the image forming apparatus 1 can make the user aware of the possibility that the print medium to be used is placed on the top of the paper feed cassette 111 with the left and right sides of the print medium to be used turned over, and the possibility that the type of the print medium to be used and the type of the designated print medium do not match.

After processing in ACT 160 is performed, the control unit 110 transitions to ACT 110 and causes the first detection unit 41 to detect the wireless tag position information formed on the print medium positioned at the top among the print media stored in the paper feed cassette 111 again. With this configuration, the control unit 110 can use the print medium newly positioned at the top among the print media stored in the paper feed cassette 111 as the print medium to be used. As a result, the image forming apparatus 1 can form an image on an appropriate print medium even if a plurality of types of print media are mixed and placed in the paper feed cassette 111.

As described above, the image forming apparatus 1 controls the conveyance unit H and the image forming unit 113 based on the wireless tag position information detected by the first detection unit 41. With this configuration, the image forming apparatus 1 can prevent failure in forming an image at a desired position on a desired type of print medium.

(Method of Manufacturing Print Medium on which Wireless Tag Position Information is Formed)

The print medium on which the wireless tag position information is formed described above is manufactured by a wireless tag position information forming apparatus capable of forming wireless tag position information indicating the position of each of one or more wireless tags on a print medium to which the one or more wireless tags are attached. For example, the print medium on which wireless tag position information is formed can also be manufactured by the image forming apparatus 1. In this case, the image forming apparatus 1 operates as an example of the wireless tag position information forming apparatus.

For example, the image forming apparatus 1 forms the wireless tag position information on the front surface of the print medium to which one or more wireless tags are attached, based on image data received from the user via an information processing apparatus communicably connected to the image forming apparatus 1. The image data is image data indicating the wireless tag position information. With this configuration, the image forming apparatus 1 can prevent various image forming apparatuses from failing to form an image at a desired position on a desired type of print medium.

A configuration in which the wireless tag position information described above further includes another straight line for distinguishing between an area on the wireless tag among areas on the print medium and an area other than the area on the wireless tag among the areas on the print medium may be adopted.

The matters described above may be combined in any way.

As above, the image forming apparatus includes the conveyance unit (conveyance unit H in the example described above), the detection unit (each of the first detection unit 41 and the second detection unit 42 in the example described above), the image forming unit (image forming unit 113 in the example described above), and the control unit (control unit 110 in the example described above). The conveyance unit conveys the print medium (print medium PB in the example described above) to which the wireless tag (each of wireless tag TGA, wireless tag TGB, wireless tag TGC in the example described above) is attached and on which the wireless tag position information indicating the position of the wireless tag is formed. The detection unit detects the wireless tag position information formed on the print medium. The image forming unit forms an image on the print medium. The control unit controls the conveyance unit and the image forming unit based on the wireless tag position information detected by the detection unit. With this configuration, the image forming apparatus can prevent failure in forming an image at a desired position on a desired type of print medium.

In the image forming apparatus, a configuration in which the wireless tag position information includes two reference lines extending in the longitudinal direction of the print medium (reference lines BLA and BLB in the example described above), a guide line obliquely crossing the two reference lines (the guide line GL in the example described above), and two straight lines associated with the wireless tag (for example, a combination of straight line LA and straight line LB in the example described above), the two straight lines are straight lines parallel to the two reference lines, and the distance between the two reference lines (predetermined distance, that is, 171.47 mm in the example described above) and the angle between the two reference lines and the guide line (predetermined angle θ in the example described above) are predetermined according to the size of the print medium may be used.

In the image forming apparatus, a configuration in which the control unit specifies the position of the wireless tag based on the distance (each of length Hi and length H2 in the example described above) between the first reference line (near reference line in the example described above) of the two reference lines, which is closer to the two straight lines, and each of the two straight lines, and the angle between the two reference lines and the guide line may be used.

A configuration in which the image forming apparatus includes a storing unit that stores the print medium, and the detection unit is provided at a position where the wireless tag position information can be detected while the print medium is conveyed from the storing unit (each of the paper feed cassette 111 and the paper feed cassette 112 in the example described above) by the conveyance unit may be used.

In the image forming apparatus, a configuration in which the wireless tag position information is formed on one of the two surfaces of the print medium may be used.

In the image forming apparatus, a configuration in which the control unit changes the conveyance destination (paper discharge tray in the example described above) by the conveyance unit based on the wireless tag position information may be used.

In the image forming apparatus, a configuration in which the control unit changes the conveyance speed of the print medium by the conveyance unit based on the wireless tag position information may be used.

In the image forming apparatus, a configuration in which the control unit adjusts the amount of toner that the image forming unit transfers onto the print medium based on the wireless tag position information may be used.

The wireless tag position information forming apparatus forms the wireless tag position information indicating the position of the wireless tag on the print medium to which the wireless tag is attached. With this configuration, the wireless tag position information forming apparatus can prevent the image forming apparatus from failing to form an image at a desired position on a desired type of print medium.

The wireless tag is attached to the print medium, and the wireless tag position information indicating the position of the wireless tag is formed on the print medium. With this configuration, as for the print medium, failure of the image forming apparatus to form an image at a desired position on a desired type of print medium can be prevented.

While several embodiments are described, the embodiments are presented by way of example and are not intended to limit the scope of the disclosure. The embodiments can be implemented in various other forms, and various omissions, substitutions, and changes may be made without departing from the scope of the disclosure. These embodiments and modifications thereof are included in the scope and gist of the disclosure, as well as the disclosure described in the claims and equivalent range thereof.

A program for realizing a function of any configuration unit in the apparatus (for example, image forming apparatus 1) described above may be recorded on a computer-readable recording medium, and the program may be read and executed by a computer system. The term "computer system" as used herein includes hardware such as operating system (OS) and peripheral devices. The term "computer-readable recording medium" refers to a storage device such as a portable medium, such as a flexible disk, magneto-optical disk, ROM, compact disk (CD)-ROM, and the like, a hard disk built in the computer system, and the like. The term "computer-readable recording medium" includes those that store a program for a certain period of time, such as a volatile memory (RAM) inside a computer system that serves as a server or client if the program is transmitted via a network such as the Internet or a communication line such as a telephone line.

The program described above may be transmitted from the computer system that stores this program in the storage device and the like to another computer system via a transmission medium or by a transmission wave in the transmission medium. The "transmission medium" for transmitting a program refers to a medium having a function of transmitting information, like a network such as the Internet (communication network), and the communication channel (communication line) such as the telephone line.

The above program may be for realizing a part of the function described above. The above program may be a so-called difference file (difference program), which can realize the function described above in combination with a program already recorded in the computer system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus, comprising:

a conveyance component configured to convey a print medium to which a wireless tag is attached and on which wireless tag position information indicating a position of the wireless tag is formed;

a detector configured to detect the wireless tag position information formed on the print medium;

an image forming component configured to form an image on the print medium; and a controller configured to control the conveyance component and the image forming component based on the wireless tag position information detected by the detector, wherein the controller is configured to at least one of:

change a conveyance destination by the conveyance component based on the wireless tag position information, change a conveyance speed of the print medium by the conveyance component based on the wireless tag position information, and adjust an amount of toner transferred onto the print medium by the image forming component based on the wireless tag position information.

2. The image forming apparatus according to claim 1, wherein the wireless tag position information includes two reference lines extending in a longitudinal direction of the print medium, a guide line obliquely crossing the two reference lines, and two straight lines associated with the wireless tag, the two straight lines are parallel to the two reference lines, and a distance between the two reference lines and an angle between the two reference lines and the guide line are predetermined according to a size of the print medium.

3. The image forming apparatus according to claim 2, wherein the controller is configured to specify the position of the wireless tag based on a distance between a first reference line, which is closer to the two straight lines, of the two reference lines and each of the two straight lines, and the angle.

4. The image forming apparatus according to claim 1, further comprising:

a storing component configured to store the print medium, wherein the detector is provided at a position where the wireless tag position information can be detected while the print medium is conveyed from the storing component by the conveyance component.

5. The image forming apparatus according to claim 1, wherein the wireless tag position information is formed on one of two surfaces of the print medium.

6. The image forming apparatus according to claim 1, wherein the controller is configured to change the conveyance destination by the conveyance component based on the wireless tag position information.

7. The image forming apparatus according to claim 1, wherein the controller is configured to change the conveyance speed of the print medium by the conveyance component based on the wireless tag position information.

8. The image forming apparatus according to claim 1, wherein the controller is configured to adjust the amount of toner transferred onto the print medium by the image forming component based on the wireless tag position information.

9. A wireless tag position information forming apparatus that forms wireless tag position information indicating a position of a wireless tag on a print medium to which the wireless tag is attached, wherein the wireless tag position information includes two reference lines extending in a longitudinal direction of the print medium, a guide line obliquely crossing the two reference lines, and two straight lines associated with the wireless tag, the two straight lines are parallel to the two reference lines, and a distance between the two reference lines and an angle between the two reference lines and the guide line are predetermined according to a size of the print medium.

10. The wireless tag position information forming apparatus according to claim 9, wherein the wireless tag is a radio frequency identification tag.

11. The wireless tag position information forming apparatus according to claim 9, further comprising:

a controller configured to specify the position of the wireless tag based on a distance between a first reference line, which is closer to the two straight lines, of the two reference lines and each of the two straight lines, and the angle.

12. The wireless tag position information forming apparatus according to claim 9, further comprising:

a storing component configured to store the print medium, wherein the detector is provided at a position where the wireless tag position information can be detected while the print medium is conveyed from the storing component by a conveyance component.

13. The wireless tag position information forming apparatus according to claim 9, wherein the wireless tag position information is formed on one of two surfaces of the print medium.

14. The wireless tag position information forming apparatus according to claim 9, further comprising:

a controller configured to change a conveyance destination by a conveyance component based on the wireless tag position information.

15. The wireless tag position information forming apparatus according to claim 9, further comprising:

a controller configured to change a conveyance speed of the print medium by the conveyance component based on the wireless tag position information.

16. The wireless tag position information forming apparatus according to claim 9, further comprising:

a controller configured to adjust an amount of toner transferred onto the print medium by an image forming component based on the wireless tag position information.

17. A print medium, comprising:

a substrate print medium;

a wireless tag attached to the substrate print medium; and wireless tag position information indicating a position of the wireless tag formed on the substrate print medium, wherein the wireless tag position information includes two reference lines extending in a longitudinal direction of the print medium, a guide line obliquely crossing the two reference lines, and two straight lines associated with the wireless tag, the two straight lines are parallel to the two reference lines, and a distance between the two reference lines and an angle between the two reference lines and the guide line are predetermined according to a size of the print medium.

18. The print medium according to claim 17, wherein the wireless tag position information is formed on one of two surfaces of the print medium.

19. The print medium according to claim 17, wherein the wireless tag position information is formed on one of two surfaces of the substrate print medium.

* * * * *